US012683273B2

(12) United States Patent
Jezersek et al.

(10) Patent No.: US 12,683,273 B2
(45) Date of Patent: Jul. 14, 2026

(54) SYSTEM FOR BACKLIGHTING A RADOME AND RADAR DEVICE

(71) Applicant: Hella Saturnus Slovenija d.o.o., Ljubljana (SI)

(72) Inventors: Nejc Jezersek, Domzale (SI); Alenka Bajec Strle, Ljubljana (SI); Tomaz Stajner, Ljubljana (SI); Andraz Tekavcic, Ljubljana (SI); Andrej Wagner, Ljubljana (SI)

(73) Assignee: Hella Saturnus Slovenija d.o.o., Ljubljana (SI)

( * ) Notice: Subject to any disclaimer, the term of this patent is extended or adjusted under 35 U.S.C. 154(b) by 261 days.

(21) Appl. No.: 18/404,561

(22) Filed: Jan. 4, 2024

(65) Prior Publication Data

US 2024/0356207 A1 Oct. 24, 2024

Related U.S. Application Data

(63) Continuation of application No. PCT/IB2021/056072, filed on Jul. 7, 2021.

(51) Int. Cl.
| | |
|---|---|
| *H01Q 1/42* | (2006.01) |
| *G01S 7/02* | (2006.01) |
| *G01S 13/931* | (2020.01) |
| *H01Q 1/32* | (2006.01) |

(52) U.S. Cl.
CPC ............. *H01Q 1/422* (2013.01); *G01S 7/027* (2021.05); *G01S 13/931* (2013.01); *H01Q 1/3233* (2013.01)

(58) Field of Classification Search
CPC ..... G01S 13/931; G01S 7/027; H01Q 1/3233; H01Q 1/42; H01Q 1/422; H01Q 15/08
See application file for complete search history.

(56) References Cited

U.S. PATENT DOCUMENTS

| | | | | |
|---|---|---|---|---|
| 6,380,883 B1 * | 4/2002 | Bell | ...................... | G01S 13/931 342/70 |
| 7,508,353 B2 * | 3/2009 | Shingyoji | ............ | H01Q 1/3233 342/13 |
| 8,752,989 B2 * | 6/2014 | Roberts | ................... | G09F 13/06 362/509 |
| 9,812,787 B2 * | 11/2017 | Binzer | ................... | H01Q 1/422 |
| 10,351,077 B2 * | 7/2019 | Yamada | ............... | H01Q 1/3233 |
| 10,431,884 B2 * | 10/2019 | Takahashi | ............ | H01Q 1/3233 |
| 10,640,055 B1 * | 5/2020 | Dellock | .............. | H01Q 1/3233 |
| 11,092,666 B2 * | 8/2021 | Fukui | ...................... | G01S 7/032 |
| 11,199,609 B2 * | 12/2021 | Ochiai | .................... | H01Q 1/42 |
| 11,199,610 B2 * | 12/2021 | Takahashi | ............. | G01S 17/931 |

(Continued)

FOREIGN PATENT DOCUMENTS

| | | |
|---|---|---|
| DE | 102018009270 A1 | 5/2020 |
| DE | 102018220997 A1 | 6/2020 |

(Continued)

*Primary Examiner* — Peter M Bythrow
(74) *Attorney, Agent, or Firm* — Husch Blackwell LLP

(57) ABSTRACT

A system is provided for backlighting a radome. The radome includes a translucent section and an opaque section. The translucent section is translucent to visible light and the opaque section is opaque to visible light. At least one light source of visible light is arranged on the rear side of the radome, and is configured for direct illumination of the translucent section.

13 Claims, 4 Drawing Sheets

(56) References Cited

U.S. PATENT DOCUMENTS

| | | | | | |
|---|---|---|---|---|---|
| 11,343,435 B2 * | 5/2022 | Frevert | | H04N 23/811 | |
| 11,650,289 B2 * | 5/2023 | Hirotani | | G01S 7/4004 | |
| | | | | | 342/70 |
| 12,078,744 B2 * | 9/2024 | Stablo | | G01S 7/028 | |
| 12,179,661 B2 * | 12/2024 | Caruso | | B44C 3/005 | |
| 12,294,145 B2 * | 5/2025 | Dubost | | H01Q 1/42 | |
| 2004/0125023 A1 * | 7/2004 | Fujii | | H01Q 1/40 | |
| | | | | | 343/711 |
| 2005/0168374 A1 * | 8/2005 | Kamiya | | B60R 11/02 | |
| | | | | | 342/198 |
| 2006/0083015 A1 * | 4/2006 | Yamazaki | | B60R 13/00 | |
| | | | | | 362/540 |
| 2007/0109206 A1 * | 5/2007 | Fujii | | H01Q 1/3233 | |
| | | | | | 343/711 |
| 2008/0233367 A1 * | 9/2008 | Maeda | | H01Q 1/40 | |
| | | | | | 427/58 |
| 2008/0309579 A1 * | 12/2008 | Maeda | | H01Q 1/3291 | |
| | | | | | 343/872 |
| 2010/0028610 A1 * | 2/2010 | Fujii | | H01Q 1/42 | |
| | | | | | 428/164 |
| 2011/0047784 A1 * | 3/2011 | Ohtake | | G01S 7/03 | |
| | | | | | 29/600 |
| 2011/0088827 A1 * | 4/2011 | Zanini | | B60R 13/005 | |
| | | | | | 156/63 |
| 2011/0273356 A1 * | 11/2011 | Kawaguchi | | H01Q 1/44 | |
| | | | | | 204/192.27 |
| 2012/0119961 A1 * | 5/2012 | Mayer Pujadas | | B60R 13/005 | |
| | | | | | 427/455 |
| 2014/0093665 A1 * | 4/2014 | Horibe | | B60R 13/005 | |
| | | | | | 428/31 |

| | | | | | |
|---|---|---|---|---|---|
| 2015/0086731 A1 * | 3/2015 | Sugiura | | B32B 37/18 | |
| | | | | | 156/196 |
| 2015/0140259 A1 * | 5/2015 | Sugiura | | G01S 7/027 | |
| | | | | | 428/161 |
| 2016/0111776 A1 * | 4/2016 | Okumura | | H01Q 1/422 | |
| | | | | | 343/872 |
| 2016/0248152 A1 * | 8/2016 | Takao | | H01Q 1/3291 | |
| 2017/0057424 A1 * | 3/2017 | Yamada | | G01S 13/931 | |
| 2017/0136739 A1 * | 5/2017 | Okumura | | B60R 13/02 | |
| 2017/0352938 A1 * | 12/2017 | Okumura | | H01Q 1/425 | |
| 2018/0159207 A1 * | 6/2018 | Shurish | | H01Q 1/421 | |
| 2018/0202626 A1 * | 7/2018 | Thoday | | B60R 13/005 | |
| 2018/0215086 A1 * | 8/2018 | Geise | | B29C 45/1671 | |
| 2018/0254551 A1 * | 9/2018 | Guretzky | | B60R 13/005 | |
| 2018/0301797 A1 * | 10/2018 | Allouis | | H01Q 1/42 | |
| 2019/0143909 A1 * | 5/2019 | Mayer Pujadas | | C23C 14/35 | |
| | | | | | 342/70 |
| 2019/0271458 A1 * | 9/2019 | Brown | | F21S 41/285 | |
| 2019/0305411 A1 * | 10/2019 | Mayer Pujadas | | H01Q 1/42 | |
| 2019/0356046 A1 * | 11/2019 | Mayer Pujadas | | B60Q 1/0011 | |
| 2020/0339053 A1 * | 10/2020 | Bicego | | G01S 13/931 | |
| 2021/0125009 A1 * | 4/2021 | Lee | | G06V 20/56 | |
| 2021/0384622 A1 * | 12/2021 | Caruso | | H01Q 1/44 | |
| 2022/0024374 A1 * | 1/2022 | Studeny | | B60R 13/005 | |
| 2022/0065422 A1 * | 3/2022 | Caruso | | F21S 43/239 | |
| 2022/0404489 A1 * | 12/2022 | Kikuchi | | H01Q 1/42 | |
| 2023/0039346 A1 * | 2/2023 | Dubost | | H01Q 1/3233 | |

FOREIGN PATENT DOCUMENTS

| | | |
|---|---|---|
| WO | 2018121855 A1 | 7/2018 |
| WO | 2021018422 A1 | 2/2021 |

* cited by examiner

SYSTEM FOR BACKLIGHTING A RADOME AND RADAR DEVICE

CROSS REFERENCE

This application claims priority to PCT Application No. PCT/IB2021/056072, filed Jul. 7, 2021, the entirety of which is hereby incorporated by reference.

FIELD OF THE INVENTION

The present invention relates to a system for backlighting a radome and a corresponding radar device, especially for motor vehicles.

BACKGROUND OF THE INVENTION

Radar devices for environmental monitoring are widely used in modern motor vehicles, especially in the course of the advancing capability for (partially) autonomous driving. Long-range radar transceivers are usually operated in the frequency range between 76 GHz and 96 GHz and short-range radar transceivers in the frequency range around 24 GHz.

In order to protect the radar transceivers from environmental and weather influences, they are covered by suitable radomes, which are designed as lid-shaped or dome-shaped covers. In order to avoid an impairment of the radar surveillance, the radomes must be designed in such a way that they have as little interaction as possible with transmitted radio waves of the aforementioned frequency ranges. On the one hand, the interaction consists of an attenuation of the radiation intensity, which is dependent on the material and wall thickness of the radome and can become significant in particular with metallic coatings, for example decorative elements made of chrome. Furthermore, surfaces and interfaces represent critical interaction centres, which can lead to reflection of radio waves in the direction of propagation or to scattering and diffraction in the transverse direction. The wavelengths of the radio waves from the aforementioned frequency ranges are of the order of a few millimetres, and to minimise reflection losses, the radomes are usually dimensioned so that their wall thickness essentially corresponds to a wavelength of the radio waves (in the medium).

In the front end of motor vehicles, radar devices are placed particularly in the centre and the associated radome is decorated with the brand logo of the respective motor vehicle manufacturer. In sophisticated designs, the radome is backlit in such a way that the brand logo is particularly prominent. For example, the brand logo can be formed by translucent areas of the radome or the brand logo stands out as an opaque pattern against an illuminated background.

For example, the DE 10 2018 009 270 A1 discloses a radome element for a distance warning radar of a vehicle. In this case, the radome element is formed as a two-component part with an inner plastic film, wherein the radome element features: a visible component made of a transparent plastic; the plastic film with a radar-transparent chrome look, which is three-dimensionally formed and printed on at least one side between the visible component and a rear component; and the rear component made of black or transparent plastic with at least one lateral transparent light coupling-in surface formed in the edge region and/or a transparent further light coupling-in surface formed in the edge region. For light extraction, i.e. backlighting the radome element, it is provided that the rear component is provided with a surface coating designed for light extraction in the direction of the visible component. The rear component thus functions here as a light guide component on whose edge light coupling surfaces light sources are to be arranged.

A disadvantage of the radome element of the DE 10 2018 009 270 A1 represents its multi-part construction, which results in a corresponding number of inner boundary surfaces potentially disturbing the propagation of transmitted radio waves. Furthermore, undesired electromagnetic interference can occur between the radar transceiver and the electrical supply lines of the light sources to be arranged at the edges of the radome element. The light sources together with their circuit boards also represent a lateral restriction of the field of view of the radar transceiver arranged behind the radome element.

BRIEF SUMMARY OF THE INVENTION

It is an object of the present invention to propose an alternative form of a system for the backlighting a radome as well as an associated radar device, which enable radar surveillance with as little interference as possible and over as wide a spatial range as possible.

This object is achieved by system for backlighting a radome and a radar device as taught herein.

The invention discloses the technical teaching that the system for backlighting a radome at least comprises: the radome with a translucent section and an opaque section, which are either translucent or opaque for visible light, and at least one light source of visible light, which is arranged on the rear side of the radome and configured for direct illumination of the translucent section.

The basic idea of the invention is to render obsolete the light guide component of the prior art radome, which is a source of impairment of the radar functionality due to reflection and/or scattering of the radio waves, by directly illuminating the rear side of the radome by means of one or preferably several light sources arranged at a distance from the radome. The radome itself can then be reduced to a one-piece body, which has a translucent section and an opaque section, whereby a defined pattern, in particular a brand logo of a motor vehicle manufacturer, is formed when viewed from the front side of the radome.

The light source for backlighting the radome is arranged in a convenient position at the rear of the radome. By definition, the rear side of the radome is intended to face a radar transceiver and the front side is intended to be exposed towards an environment. The desired backlighting effect is thus revealed to an observer of the radome front.

The light source is arranged at a distance from the rear side of the radome, in particular sidelong of a position intended for a radar transceiver, and is thus arranged for direct illumination of the rear side of the radome, in particular for direct illumination of the translucent section of the radome. The translucent section comprises that section of the radome through which the light transmitted during backlighting passes.

Preferably the radome features a translucent radome body, wherein the opaque section features light absorbing means, which are applied on and/or integrated in the radome body. The radome body is typically provided as an injection moulded component of a polycarbonate or polycarbonate-polyethylene blend and is matched in thickness to the wavelength of a radio signal used for radar surveillance. The opaque section of the radome body is determined by the light absorbing means which are either applied to a surface of the radome body or incorporated in the body, for example by overmoulding. The opaque section of the radome is not necessarily formed by a geometrically contiguous region, but the term rather refers to the totality of all opaque (sub-)sections. The same applies to the translucent section.

For example, the light absorbing means feature colour pigments and/or a metallic coating, especially an indium or germanium coating. The colour pigments can be applied in particular as a lacquer and the metallic coating by means of a deposition process of physical or chemical vapour deposition. Due to the pronounced absorption of metallic coatings, their layer thickness should be kept as thin as possible, for example in the order of 30 nm to 200 nm, and especially the use of indium or germanium coatings has proven to be advantageous for radome applications. In particular, to create a desired design appearance of the radome, there can also be a combination of different light absorbing means, for example a combination of colour pigmented areas and areas with a metallic appearance. The colour pigments and/or the metallic coating can be especially applied to the rear surface of the radome body which is not exposed to the environment in an intended installation position in a motor vehicle and therefore less prone to wear.

In a preferred embodiment the light absorbing means are applied on a carrier foil, which is applied on and/or integrated in the radome body. The use of a carrier foil enables a particularly effective process on the production side, i.e., the carrier film is printed and/or coated with a desired pattern and then glued onto the translucent radome body or overmoulded as an insert in the injection moulding process by the material forming the radome body.

In a special embodiment the rear surface of the radome body and/or the carrier foil features a diffusing effect on transmitted visible light. It is intended that the carrier foil also extends over the translucent section of the radome body, so that the backlighting creates a particularly homogeneous and two-dimensional impression for the observer due to the scattering effect of the carrier foil. Furthermore, a diffusing effect can be generated by an appropriate treatment of the rear surface of the radome body, especially by introducing a dedicated roughness.

According to another preferred embodiment, the system comprises at least one optical projection element associated with the light source, especially a lens system or a diffractive optical element. Such projection optics arranged at the light source serve the dedicated and purposeful backlighting of the translucent section of the radome. In particular, a high light yield can be ensured through appropriate focusing. When using a plurality of light sources, each individual light source is preferably assigned its own optical projection element. A diffractive optical element is suitable, for example, for splitting the beam from a single light source so that different sections of the radome can be illuminated by sub-beams.

Preferably the radome is attached to a back cover, so that the radome and the back cover enclose an interior, wherein the light source is arranged in the interior. Such a housing-like design provides a particularly high degree of protection against weather or other environmental influences for the components housed inside, in particular the light source and the associated optical projection element.

In particular, the translucent section and the opaque section form a defined pattern, especially representing a brand logo or a pattern of a general design appeal. A main application of the system for backlighting a radome according to the invention is for the front end of motor vehicles. Furthermore, backlit radomes can also represent general design elements or function as additional position lights in other sections of a motor vehicle, for example the rear end.

The invention further concerns a radar device, especially for a motor vehicle, at least comprising a system for backlighting a radome according to one of the previous embodiments and a radar transceiver arranged on the rear side of the radome, wherein the light source is arranged outside the field-of-regard of the radar transceiver, and/or wherein the radar transceiver is especially arranged outside the illumination range of the light source. Owing to the freedom regarding the concrete arrangement of the light source, it can be prevented that the radar transceiver and the light source interfere with each other in their respective working areas, i.e., in particular there is no shadowing or limitation of the field-of-regard of the radar transceiver by the light source or belonging components. In a particular embodiment, the radar transceiver can be intentionally arranged partly inside the illumination range of the light source and thus serve as a dedicated shading element contributing to the backlighting strategy.

In a particular embodiment of the radar device, several light sources are arranged laterally around the radar transceiver. In particular, the radar transceiver is arranged centrally behind the rear side of the radome and the light sources form a ring-shaped arrangement around it, so that the superimposition of their light cones, i.e., illumination ranges enables full-area backlighting of the radome.

In another embodiment of the radar device, the radar transceiver is arranged in the interior enclosed by the radome and the back cover. In this embodiment, the radar transceiver and also the light source are encapsulated, i.e., maximally protected from environmental and weather influences. In principle, however, it is also possible according to the invention to arrange the radar transceiver outside the rear cover, for which purpose the latter may feature a receiving section for the radar transceiver. It is thus also possible to retrofit existing radar devices with the system for backlighting a radome according to the invention.

In a preferred embodiment the light source and the radar transceiver are arranged on a joint printed circuit board. This allows for a compact and space-saving design and, in particular, prevents the printed circuit board of the light source from entering the field-of-regard of the radar transceiver.

Preferably the printed circuit board features separate electrical circuits for the light source and the radar transceiver. Owing to separate circuits, the typically safety-relevant radar transceiver can be operated independently of the light source.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Figure 1:
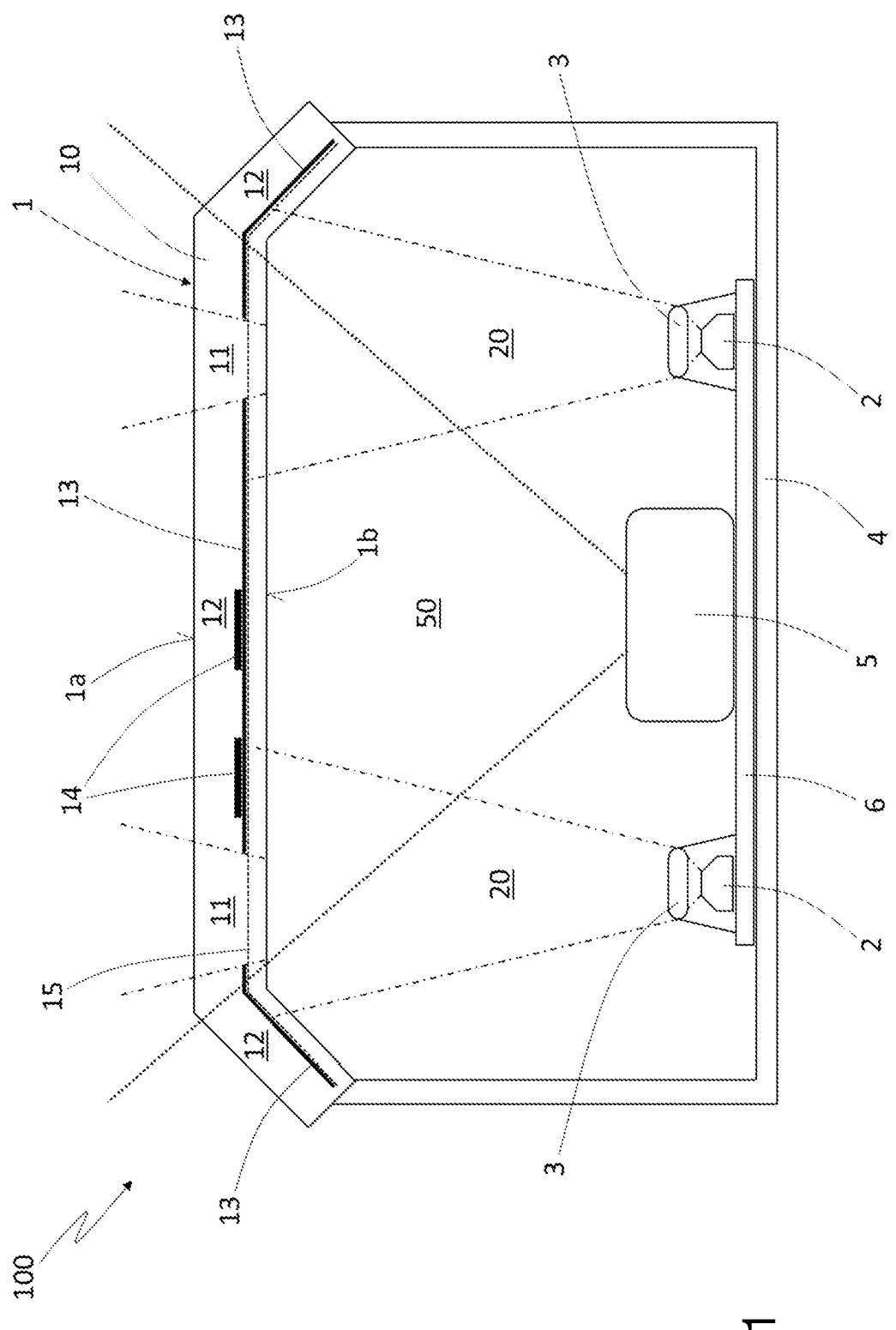
FIG. 1 is a schematic cross-section of a first embodiment of the radar device.

FIG. 1 shows a schematic cross-sectional view of a first embodiment of a radar device 100 according to the invention with the system for backlighting the radome 1 according to the invention. The radome 1 and the back cover 4 enclose an interior space like a housing and the radar transceiver 5 and a plurality of light sources 2 are accommodated therein on the joint printed circuit board 6. The radar transceiver 5 and the light sources 2 are arranged on the rear side 1*b* of the radome 1 and are spaced apart from each other in such a way that the light sources 2 do not extend into the field-of-regard 50 of the radar transceiver 5 and the radar transceiver 5 does not lead to shadowing of the light cones 20 representing the illumination range of the light sources 2. The projection lenses 3 are arranged in front of each of the light sources 2. The light cones 20 yield a direct illumination of the rear side 1*b* of the radome 1, in particular of the translucent section 11, which in the present representation comprises two sub-sections. The translucent section 11 comprises the section of the radome body 10 through which the light transmitted during backlighting passes.

The radome 1 comprises the radome body 10, which is made of a material, which is translucent for visible light and radio waves, in particular a polycarbonate. The carrier foil 15 is integrated in the radome body 10, which carries the light absorption means as the colour pigments 13 and the metallic coating 14 to form the opaque section 12 of the radome 1. For an observer of the front side 1*a* of the radome 1 located outside the radar device 100, a defined pattern is formed by the entirety of the translucent section 11 and the opaque section 12 of the radome 1, for example a brand logo of a motor vehicle manufacturer, which has a particularly prominent and appealing appearance due to the backlighting. Due to the one-piece design of the radome body 10, in which only the thin carrier foil 15 together with the light absorption means is enclosed, a comparably low-loss and low-interference transmission of the radio waves emitted or received by the radar transceiver 5 is guaranteed.

Figure 2:
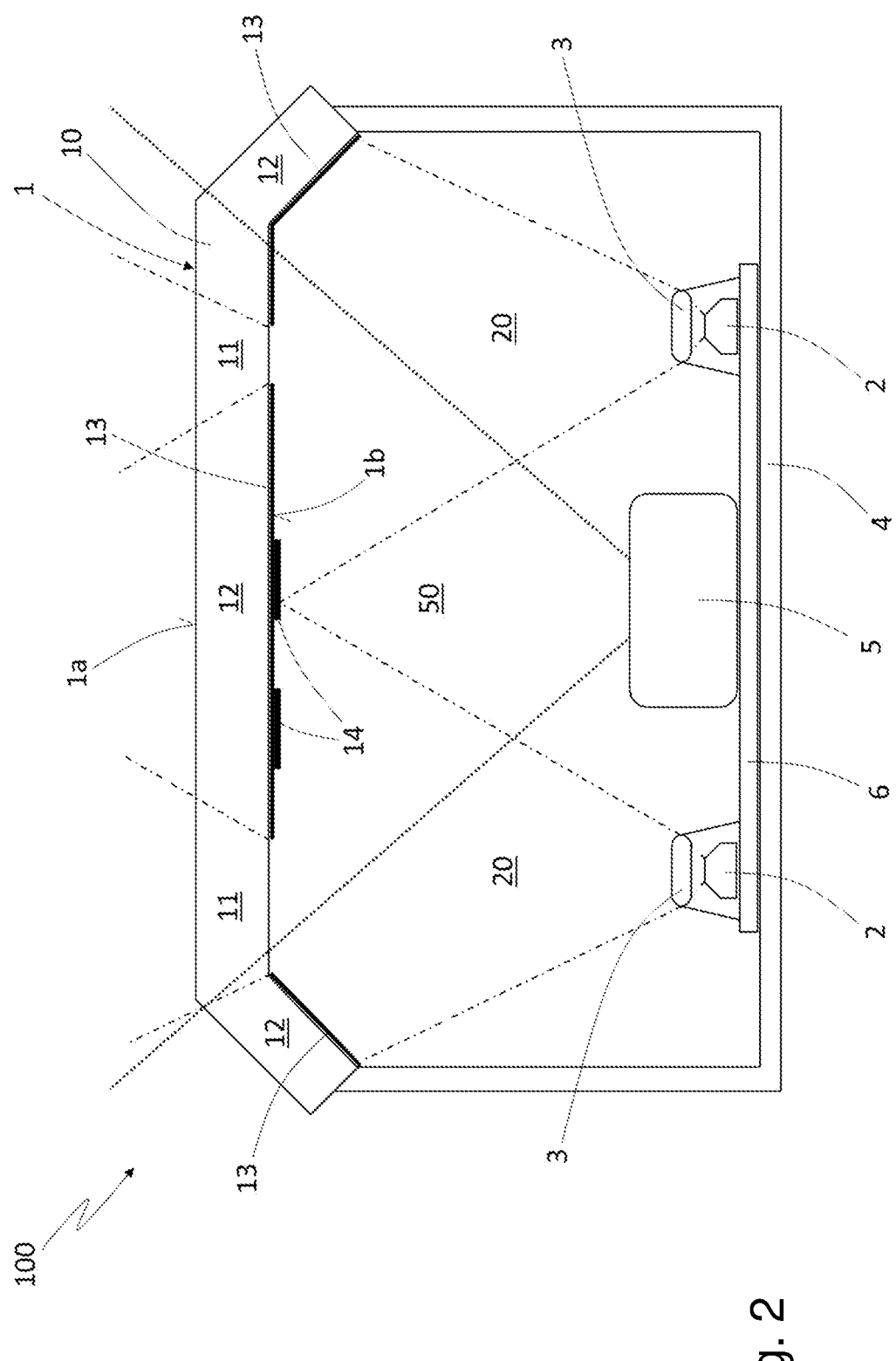
FIG. 2 is a schematic cross-section of a second embodiment of the radar device.

FIG. 2 shows a second embodiment of a radar device 100 according to the invention, wherein in contrast to the first embodiment of FIG. 1 the colour pigments 13 and the metallic coating 14 are applied directly to the rear surface of the radome body 10, i.e., without any carrier foil. The rear surface of the radome body 10 furthermore features a dedicated roughness—at least in the translucent section 11—in order to generate a diffusing effect on the transmitted visible light from the light sources 2.

Figure 3:
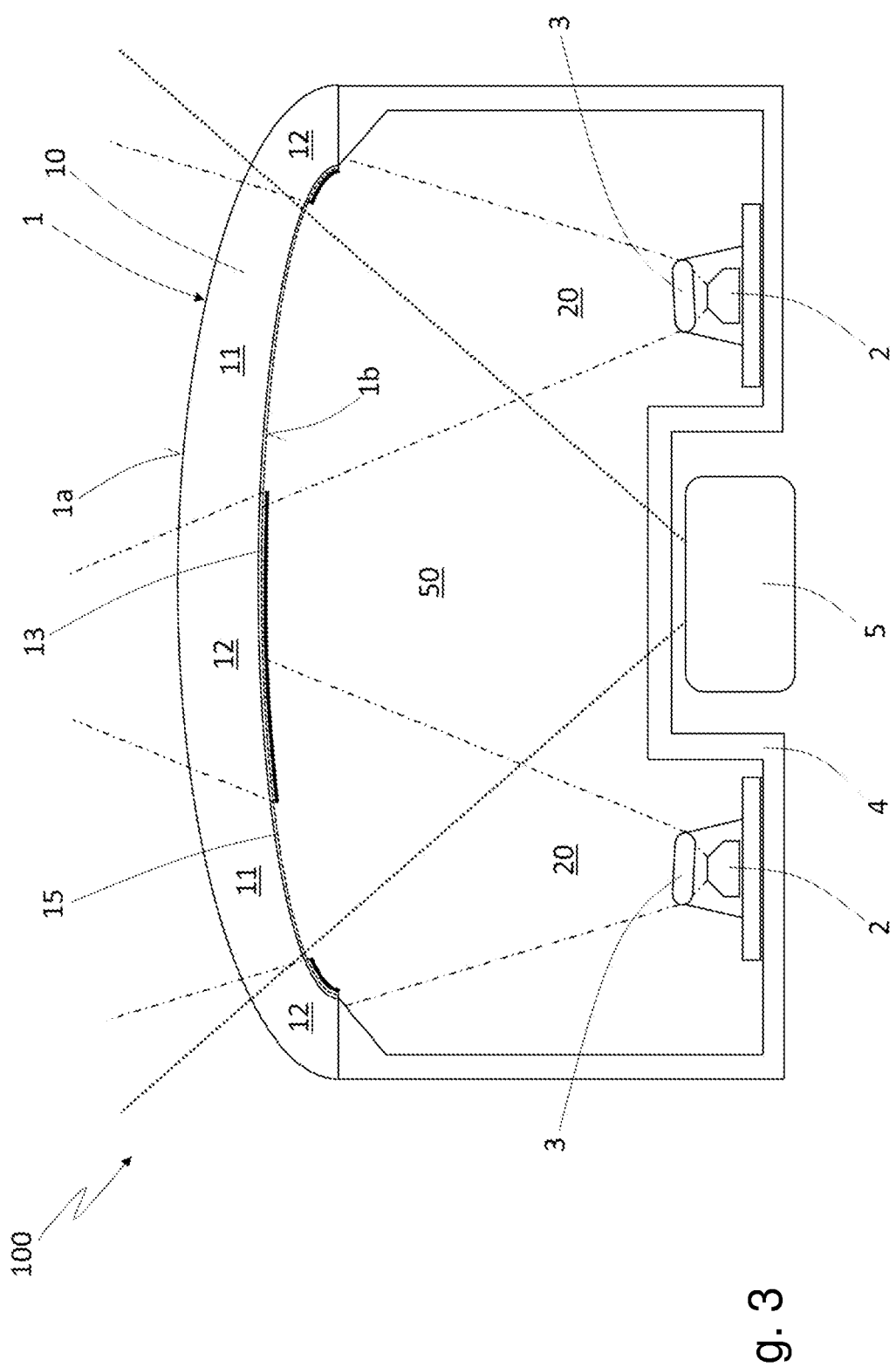
FIG. 3 is a schematic cross-section of a third embodiment of the radar device.

FIG. 3 shows a third embodiment of a radar device 100 according to the invention, in which the radar transceiver 5 is arranged outside the back cover 4. In this embodiment, the radio waves used for radar surveillance must therefore also pass through the back cover 4. However, the dimensions of the back cover 4 can be precisely matched to the wavelength of the radiation so that the transmission losses can be kept to a minimum, so that in this embodiment, too, there is an improved radar functionality compared to a backlit radome with a light guide body according to the prior art.

The carrier foil 15 with the light absorbing means in the form of the colour pigments 13 is applied, for example glued, to the rear surface of the radome body 10.

Figure 4:
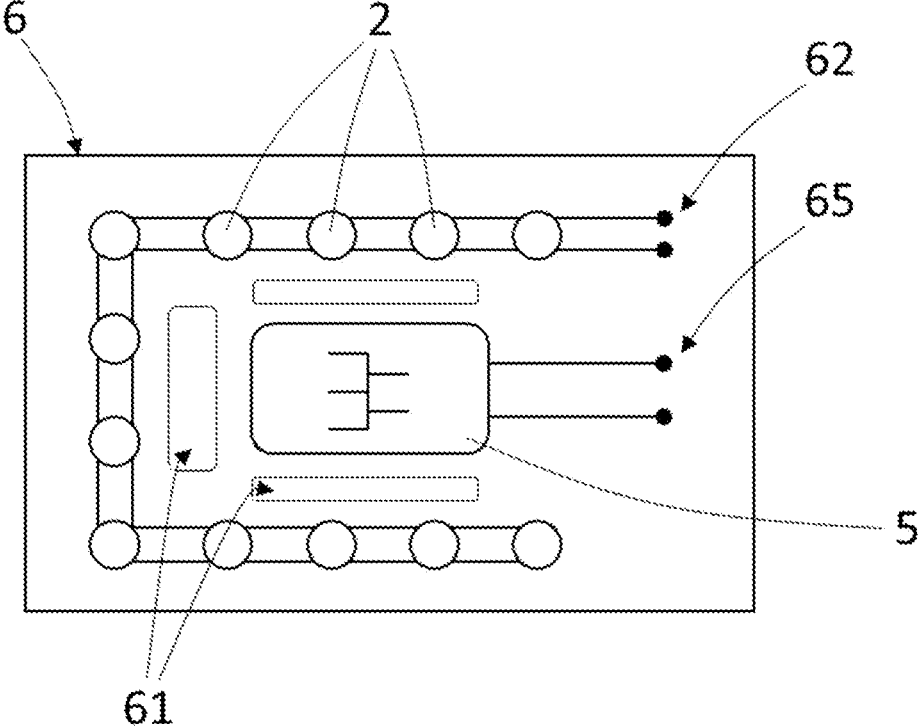
FIG. 4 is a schematic top view of a printed circuit board of a radar device.

FIG. 4 shows a schematic view of a printed circuit board 6 of a radar device according to the invention, on which both a plurality of light sources 2 and a radar transceiver 5 are accommodated. The printed circuit board 6 has a first circuit 62 for operating the light sources 2 and a second circuit 65 for operating the radar transceiver 5. Owing to this separation, the radar transceiver 5 can be operated independently of any malfunctions of the light sources 2.

The light sources 2 are arranged laterally around the radar transceiver 5, approximately in the shape of a horseshoe, which enables large-area illumination of the rear side of an associated radome.

The wide slits 61, which are arranged between the light sources 2 and the radar transceiver 5, serve to efficiently dissipate heat from the printed circuit board 6.

The present invention is not limited by the embodiments described above, which are represented as examples only and can be modified in various ways within the scope of protection defined by the appending patent claims.

LIST OF NUMERALS

100 radar device
1 radome
1*a* front side
1*b* rear side
10 radome body
11 translucent section
12 opaque section
13 colour pigment
14 metallic coating
15 carrier foil
2 light source
20 illumination range
3 optical projection element
4 back cover
5 radar transceiver
50 radar field-of-regard
6 printed circuit board
61 slit
62, 65 electrical circuit

The invention claimed is:

1. A system comprising:
   a radome having a translucent section and an opaque section, wherein the translucent section is translucent to visible light and the opaque section is opaque to visible light;
   a plurality of light sources of visible light, the plurality of light sources being arranged on a rear side of the radome, the plurality of light sources directly illuminating the translucent section; and
   a plurality of optical projection elements arranged at and in front of the plurality of light sources, wherein each optical projection element of the plurality of optical projection elements is dedicated to a respective light source of the plurality of light sources, and wherein each optical projection element of the plurality of optical projection elements includes a lens system or a diffractive optical element.

2. The system according to claim 1, wherein the radome includes a translucent radome body, wherein the opaque section includes light absorbing means which are applied on and/or integrated in the radome body.

3. The system according to claim 2, wherein the light absorbing means include colour pigments and/or a metallic coating.

4. The system according to claim 2, wherein the light absorbing means are applied on a carrier foil applied on and/or integrated in the radome body.

5. The system according to claim 4, wherein a rear surface of the radome body and/or the carrier foil include a diffusing effect on transmitted visible light.

6. The system according to claim 1, wherein the radome is attached to a back cover such that the radome and the back cover enclose an interior, wherein the plurality of light sources and the plurality of optical projection elements are arranged in the interior.

7. The system according to claim 1, wherein the translucent section and the opaque section form a defined pattern.

8. A radar device comprising:

a system according to claim 1; and a radar transceiver arranged on the rear side of the radome, wherein the plurality of light sources is arranged outside a field-of-regard of the radar transceiver, and/or wherein the radar transceiver is arranged outside an illumination range of the plurality of light sources.

9. The radar device according to claim 8, wherein the plurality of light sources is arranged laterally around the radar transceiver.

10. The radar device according to claim 8, wherein the radome is attached to a back cover such that the radome and the back cover enclose an interior, wherein the plurality of light sources is arranged in the interior, and wherein the radar transceiver is arranged in the interior enclosed by the radome and the back cover.

11. The radar device according to claim 8, wherein the plurality of light sources and the radar transceiver are arranged on a joint printed circuit board.

12. The radar device according to claim 11, wherein the printed circuit board features separate electrical circuits for the plurality of light sources and the radar transceiver.

13. The system according to claim 3, wherein the colour pigments and/or a metallic coating are an indium or germanium coating.

\*  \*  \*  \*  \*